May 16, 1950 — M. H. TUFT — 2,507,742
CROP GATHERING MEANS FOR HARVESTERS
Filed May 11, 1942 — 5 Sheets-Sheet 1

INVENTOR
Miles H. Tuft
BY
ATTORNEYS

May 16, 1950   M. H. TUFT   2,507,742
CROP GATHERING MEANS FOR HARVESTERS
Filed May 11, 1942   5 Sheets-Sheet 3

INVENTOR
Miles H. Tuft
BY
ATTORNEYS

May 16, 1950 — M. H. TUFT — 2,507,742
CROP GATHERING MEANS FOR HARVESTERS
Filed May 11, 1942 — 5 Sheets-Sheet 4
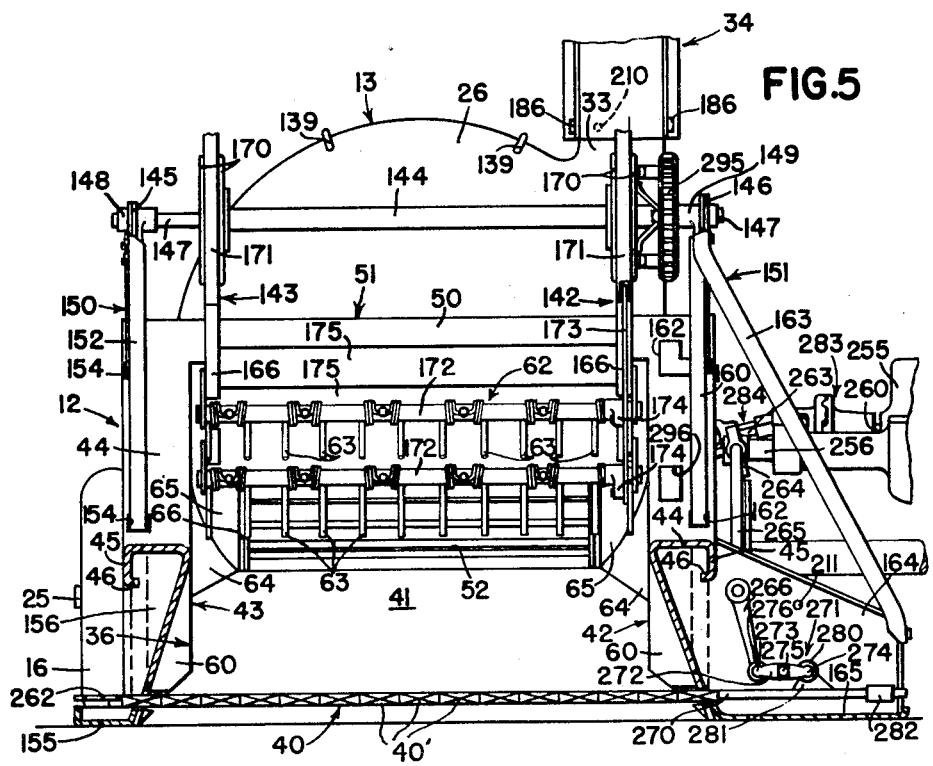
FIG.5
INVENTOR
Miles H. Tuft
BY
ATTORNEYS May 16, 1950  M. H. TUFT  2,507,742
CROP GATHERING MEANS FOR HARVESTERS
Filed May 11, 1942  5 Sheets-Sheet 5

INVENTOR
Miles H. Tuft
BY
ATTORNEYS

Patented May 16, 1950

2,507,742

UNITED STATES PATENT OFFICE 2,507,742

CROP GATHERING MEANS FOR HARVESTERS

Miles H. Tuft, Ottumwa, Iowa, assignor, by mesne assignments, to Deere Manufacturing Co., a corporation of Iowa Application May 11, 1942, Serial No. 442,563

5 Claims. (Cl. 56—158)

The present invention relates to agricultural implements, and is more particularly concerned with that class of implements known as ensilage harvesters which cut the standing crop and reduce it to ensilage.

The object and general nature of this invention is the provision of a new and improved machine that is adapted to handle any of the usual ensilage crops under extreme field conditions with utmost efficiency and that is, at the same time, compact, light in weight, and inexpensive to manufacture.

Another important feature of this invention is the provision of means for bending the standing crop ahead of the mower bar in toward the longitudinal center line of the mower bar so that the crop tends to fall laterally inwardly when cut. This permits the use of a mower bar wider than the platform and associated feed and cutting mechanisms.

It is also a feature of this invention to provide an ensilage harvester in which the mower bar is wider than the reel, together with means for bending the standing crop in toward the center of the reel so that the crop for the entire width of the mower bar is engaged by the reel and is drawn thereby into the mower bar.

These and other objects and advantages of the present invention will become apparent to those skilled in the art after consideration of the following description of the preferred embodiment thereof, reference being had to the accompanying drawings, in which:

Figure 5 is a sectional view taken along the line 5—5 in Figure 3 but on a larger scale;

Figure 1:
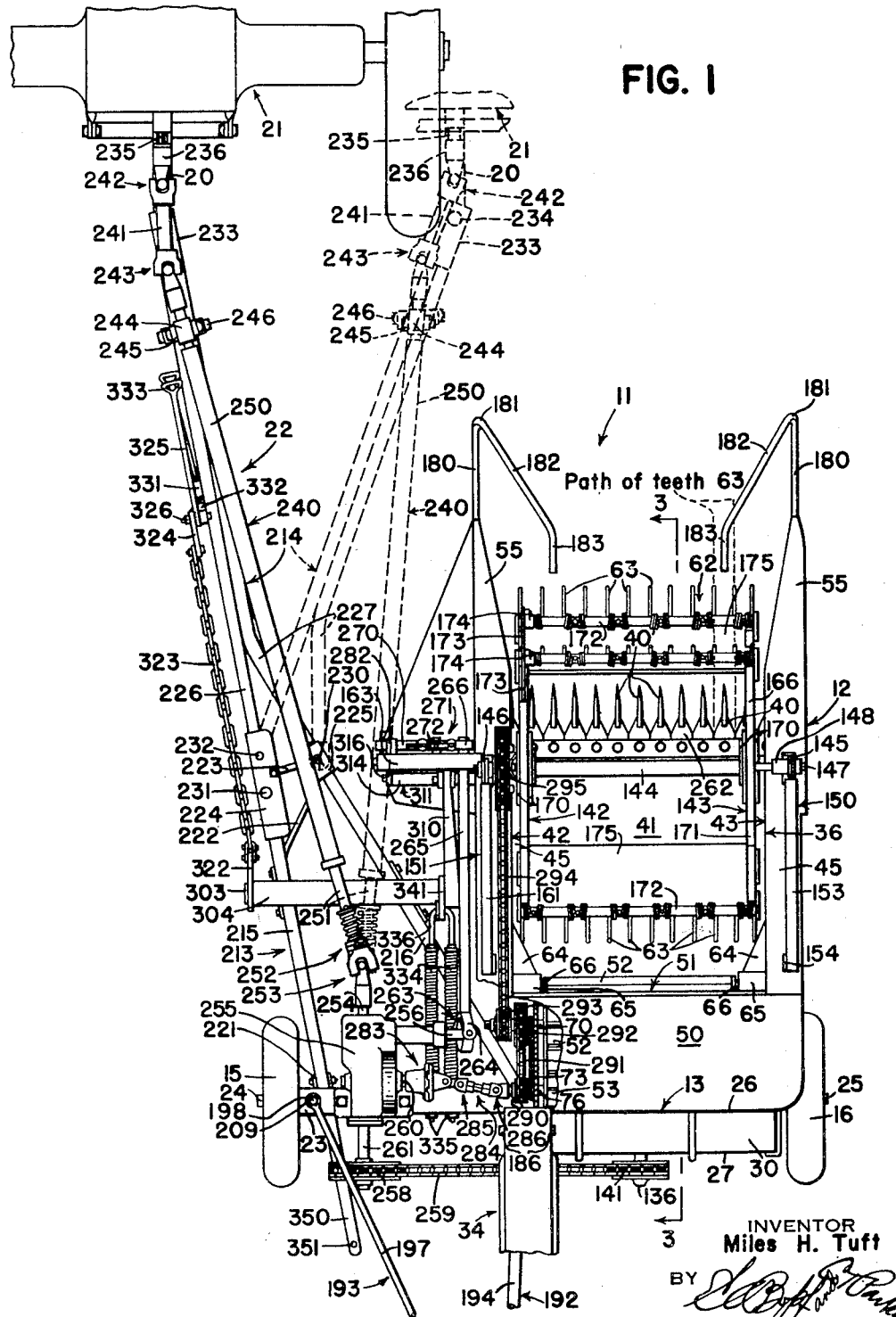
Figure 1 is a top plan view of a tractor drawn ensilage harvester constructed according to the principles of my invention.

Referring now to the drawings, the ensilage harvester is indicated in its entirety by the reference numeral 11, and comprises a harvesting unit 12 and ensilage cutting unit 13 mounted on a main frame 14 which is supported on a pair of laterally spaced wheels 15 and 16. The frame 14 is adapted to be connected to the drawbar 20 of a tractor 21 by means of a draft frame 22 which is so constructed and arranged that the implement is normally offset laterally to the right of the longitudinal center line of the tractor, with the harvesting unit 12 disposed just outside or to the right of a longitudinal vertical plane passed through the right rear wheel of the tractor.

The main frame 14 includes a transversely disposed box beam 23 (Figures 1 and 2) having laterally extending stub axles 24 and 25 fixed to the ends thereof on which the wheels 15 and 16, respectively, are journaled. The ensilage cutting mechanism is contained within a generally circular housing comprising front and rear walls 26 and 27, and a cylindrical side wall 30. The front wall 26 of the housing is welded to the back of the box beam 23, and additional support for the housing is provided by a pair of laterally spaced bracing members 31 and 32 which are likewise welded to the back of the box beam and also to the side walls 30. Leading off from the left hand side of the housing is an upwardly directed discharge throat 33, and connected with the end of the throat is an upwardly and rearwardly extending, curved conduit 34 through which the finely chopped material is propelled back to a wagon 35 towed behind the ensilage harvester.

Figure 2:
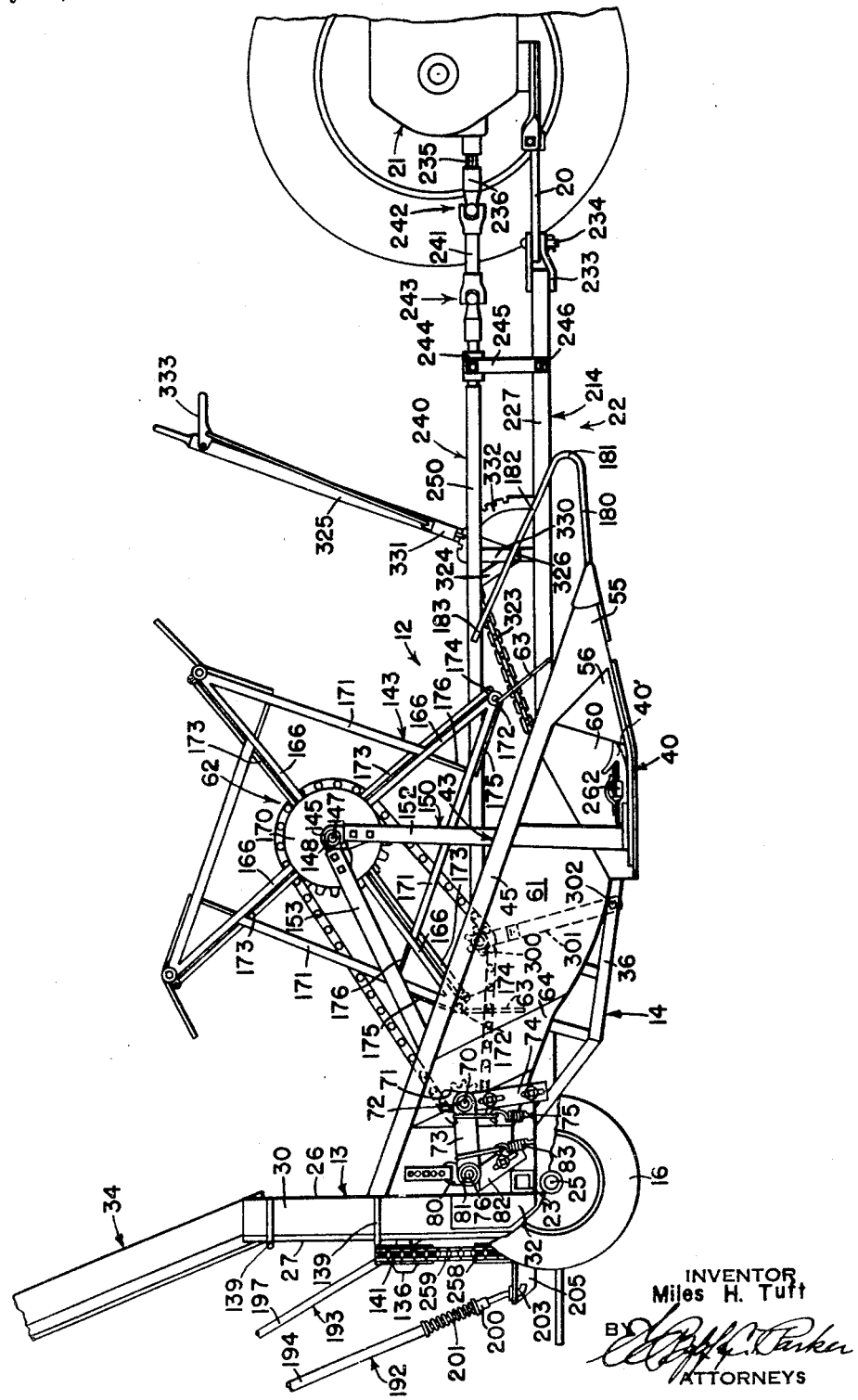
Figure 2 is a side elevation of the same, the near wheel of the tractor being removed, and that of the implement being partially broken away to show more clearly certain details of construction.
Figure 3:
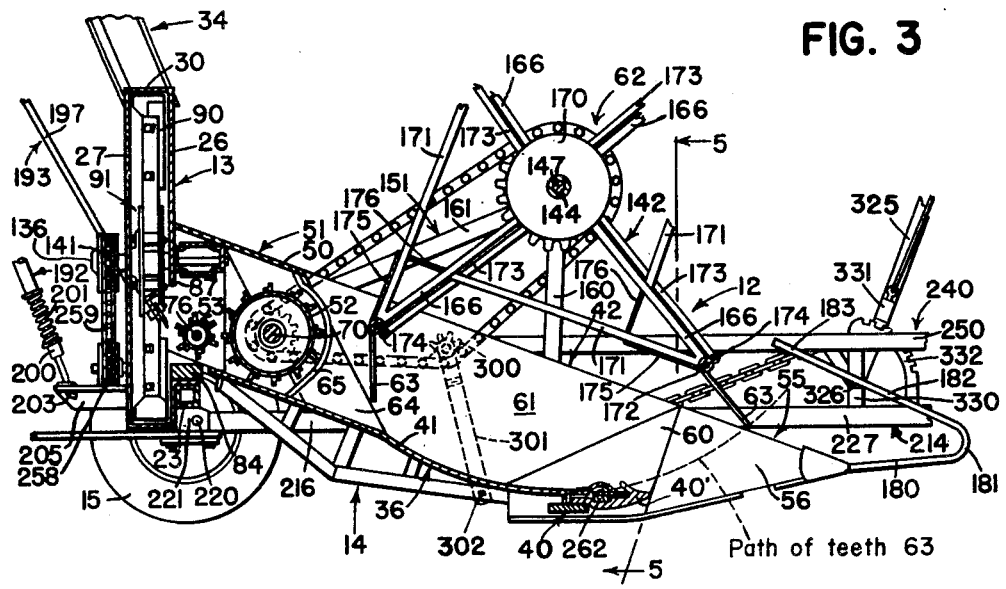
Figure 3 is a vertical longitudinal section taken through the machine substantially along the line 3—3 in Figure 1.

The harvesting unit 12 is disposed directly ahead of the ensilage cutter housing and includes a forwardly extending, downwardly inclined platform 36, the front end of which is disposed closely adjacent the ground and is provided with a cutter bar 40, including a series of transversely spaced guard fingers 40' for cutting the standing crop. The platform 36 comprises a sheet metal deck 41 mounted on top of the frame 14 and having upwardly extending sides 42 and 43. Each of the sides 42, 43 has its upper edge formed in the shape of a channel comprising a flat top portion 44 and a downwardly extending outside edge portion 45, with an inwardly turned flange 46 provided along the bottom edge thereof (Figure 5). This construction of the sheet metal sides adds considerably to the strength and rigidity of the harvesting unit without appreciably increasing its weight. The rear ends of the sides 42, 43 are welded to the front wall 26 of the ensilage cutter housing, so that the harvesting and ensilage cutting units are rigidly joined together to form a single, unitary body. Extending across the top of the platform 36 and welded to the sides 42, 43 and to the front wall 26 of the cutter housing is a shelf 50 which forms the top of a compartment 51 enclosing feed rolls 52 and 53 for feeding the material to the ensilage cutting mechanism. The front ends of the sides 42, 43 project ahead of the cutter bar 40 and terminate in deflectors 55 which divide a path through the standing grain substantially the width of the cutter bar. The inside faces 56 of the deflectors are triangularly shaped (Figure 3), with the bottom edges thereof extending substantially directly ahead from the outer ends of the cutter bar 40 and the top edges converging rearwardly from the front ends of the points, so that the faces 56 of the deflectors are inclined laterally inwardly toward the longitudinal center line of the cutter bar 40 in overhanging relation thereto, and the standing grain ahead of the cutter bar is bent inwardly so that it tends to fall in that direction when cut. To the rear of each of the triangularly shaped portions 56 is a second triangular portion 60, the apex if which substantially coincides with the apex of the triangular portion 56 and overhangs the cutter bar, and the bottom edge of which extends diagonally rearwardly and inwardly behind the cutter bar 40 so that the triangular portions 60 converge and tend to bunch the cut vegetation on the deck 41 after it has been cut. Behind the triangular portions 60 are trapezoidal wall portions 61 which are perpendicular to the deck 41 and are parallel to one another. Disposed within the space between the wall portions 61 is a reel 62 having radially outwardly extending spring tines 63 which engage the material and move it up the platform to the feed roll compartment 51. The transverse spacing of the tines 63 is on the order of the transverse spacing of the guard fingers 40', and the tines are arranged to travel in arcuate paths respectively lying in generally vertical, longitudinal planes between the guard fingers 40', as seen in Figure 1. Behind the trapezoidal portions 61, the walls 42, 43 converge rearwardly at 64, whereby the material on the platform is bunched together into a still narrower body just before entering the feed roll compartment 51.

The compartment 51 is provided with a curved front wall 65 having an opening 66 therein to receive the material raked up the platform by the reel. The front feed roll 52 is disposed immediately behind the opening 66 and is mounted on a transverse shaft 70 which extends through vertical slots 71 (Figure 2) in the sides of the compartment, and is journaled at each end in bearings 72 mounted on the front end of a fore and aft extending radius arm 73. The front end of the radius arm is freely movable up and down and is yieldingly held down against a vertically adjustable limit stop 74 by means of a spring 75. The rear feed roll 53 is mounted on a transverse shaft 76 which extends through vertical slots 80 in the sides of the compartment and is journaled in bearings 81 mounted on the rear end of the radius arm 73. The rear end of the radius arm is likewise freely movable up and down and is yieldingly held down against a vertically adjustable limit stop 82 by a spring 83.

The rear feed roll 53 is cooperatively associated with a stationary shear member 84 (Figure 4) forming a part of the ensilage cutting mechanism. The shear member 84 is disposed transverse to the direction of forward travel and is mounted on top of the box beam 23 in an opening 87 provided in the front wall 26 of the cutter housing for passage of the crop material into the cutter housing. The shear member coacts with the blades 90 of a rotary cutter 91, in a manner well understood, to shear the crop material as it is fed rearwardly over the shear member by the feed roll 53.

The rotary cutter 91 may be of any appropriate construction and details thereof have not been described.

Figure 4:
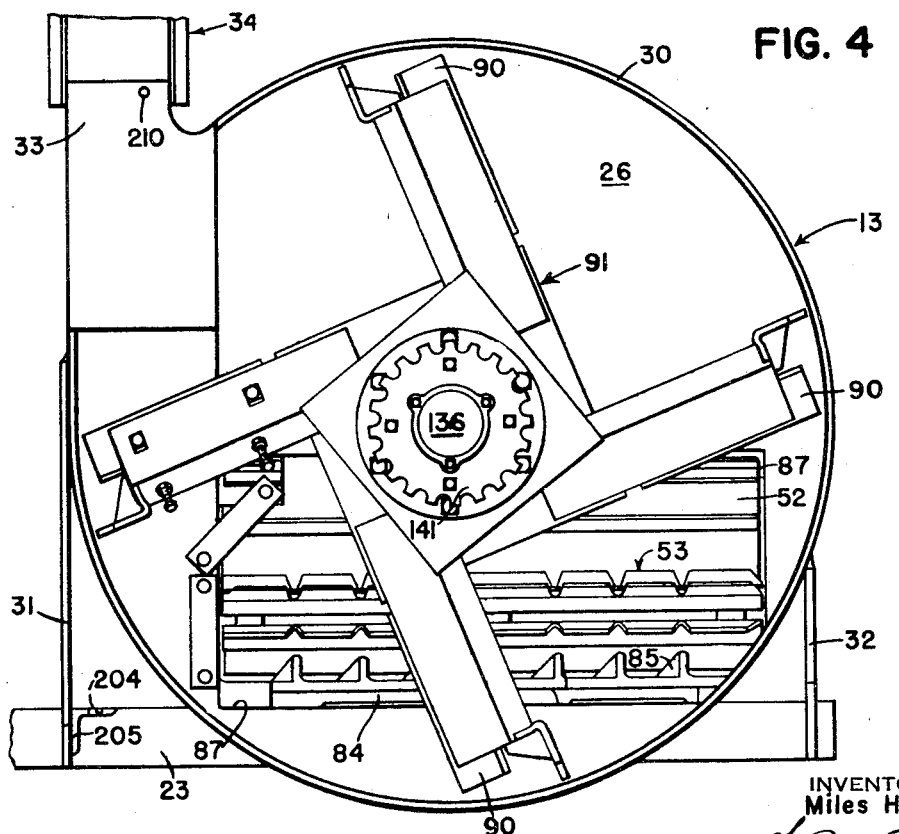
Figure 4 is an enlarged rear view of the cutter housing with the back removed.

The cutter 91 rotates with a shaft 130 which projects through an opening in the back wall 27 of the cutter housing and which is provided with a sprocket wheel 141 (Figure 4).

Returning now to the illustration of the rake wheel 62 (Figures 1 and 5), it will be seen that said reel comprises a pair of axially spaced reel heads 142 and 143 fixed to a transverse pipe 144 which is fixed on a shaft 147 extending therethrough and has its ends journaled in bearings 148 and 149. The bearings 148, 149 are fixed to brackets 145 and 146 mounted on the upper ends of supporting structures 150 and 151, respectively. The right hand supporting structure 150 consists of a pair of angle irons 152 and 153 which are fixed at their lower ends to the platform side wall 43 and extend upwardly therefrom in converging relation through openings 154 in the shelf 44, and are bolted at their upper ends to the bracket member 145. The forward angle iron 152 is substantially vertical and extends down to the cutter bar 40 which is fixed at its end to a ground shoe 155 extending laterally outwardly from the bottom of the platform wall at the front end thereof. A bracing wall 156 is fixed to the sheet metal wall 43 ahead of the angle iron to stiffen the same.

The left hand supporting structure 151 likewise includes a pair of angle irons 160 and 161 which are fixed at their lower ends to the platform side wall 42 and extend upwardly therefrom in converging relation through openings 162 in the shelf 44, and are bolted at their upper ends to the bracket members 146. A third angle iron 163 is fixed to the brackets 146 and extends downwardly and laterally away from the platform and is bolted at its lower end to the outside edge of a side bracing wall 164. The wall 164 is welded to the platform side wall 42 ahead of the vertical angle iron 160 to stiffen the wall, and extends laterally outwardly beyond the outer edge 45 of the wall to provide support for the cutter bar operating mechanism and for a wide ground shoe or runner 165 at the bottom of the platform wall 42.

The reel heads 142, 143 each comprise a plurality of angularly spaced radial members 166, the inner ends of which are disposed between and fixed to a pair of spaced circular hub members 170. Fixed to the outer end of each of the radial members 166 is a bracing member 171 which is fixed to the preceding radial member intermediate the ends thereof. Transverse tubular members 172 are journaled in the outer ends of corresponding radial members 166 of the rake heads 142, 143, respectively, and the spring teeth 63 are mounted thereon at axially spaced intervals and spaced to generate arcs disposed between the guard fingers of the cutter bar 40.

During the downward and rearward swing of the teeth 63 as they first engage the standing crop ahead of the cutter bar 40 and sweep the crop rearwardly through the cutter bar and up the platform 36, the teeth are held in radially extended position so as to obtain good purchase on the crop and secure the maximum reach. As the teeth start the upward swing behind the axis of rotation of the reel, the tubular member 172 is rocked so that the teeth are substantially vertical and thus can be withdrawn from the cut vegetation without tending to lift the same off the deck of the platform. When the teeth are entirely clear of the material on the deck, the tubular member 172 is again rocked back to its original position with the teeth in radially extended position in readiness to engage the standing crop again. The rocking movement of the members 172 is produced by means of links 173, each of which is connected to an arm 174 fixed to the end of the tubular member 172 and extends radially inwardly therefrom along the back of the radial member 166. The inner end of the link 173 is disposed between the hub plates 170 and engages a cam (not shown) which is fixed to the bearing 149. The latter extends through a center opening in the outer plate to make connection with the cam. The cam is shaped to produce the desired movement of the link as the reel rotates.

Sheet metal paddles 175 are fixed to the outer ends of corresponding bracing members 171 on the rake heads 142, 143 for the purpose of pressing the crop back down against the platform and to prevent the crop from wrapping around the tubular tooth-carrying members 172. The paddles 175, being flat against their respectve pairs of bracing members 171 and therefore non-radial with respect to the axis of rotation of the rake reel, sweep downwardly on top of the standing grain in a substantially horizontal position and leave the platform, on the upward swing, in a substantially vertical position, so that any material clinging to the paddles tends to drop free. Struts 176 are fixed to the bracing members 171 adjacent the radially inner edge of the paddles 172 and to the associated radial member 166 adjacent the point of connection with the succeeding bracing member to stiffen the bracing member on which the paddle is mounted, and to prevent it from buckling under the pressure of the paddle against densely growing crops.

The standing crop ahead of the cutter bar is bent laterally inwardly into the path of the rake reel 62 by a pair of rods 180 which are fixed to the front ends of the deflectors 55 and extend forwardly therefrom. The rods 180 are bent upwardly and rearwardly at 181, and extend rearwardly at 182 in converging relation, the rear end portions 183 thereof being bent into parallelism and extending directly into the path of the rake teeth 63 so that crop held between the end portions 183 of the rods is stripped away by the spring teeth 63.

The conduit 34 through which the finely cut material is propelled from the cutter housing 13 to the wagon 35, consists of a straight portion 184 and a curved portion 185. The lower end of the straight section 184 sets over the top of the discharge throat 33 and is secured thereto by bolts 186 (Figure 5) which are passed through aligned holes in the sides of the conduit and the discharge throat, respectively.

The upper end of the conduit 34 is held by a pair of supporting legs 192 and 193 in either rearwardly or laterally extending position, as the case may be, to discharge into the wagon 35 when the latter is towed directly behind or alongside the ensilage harvester. The leg 192, which is disposed substantially in the vertical plane of the conduit and therefore supports most of the weight, is a cushioned support and comprises a pipe 194 connected at the upper end to a bracket 195 fixed to the conduit side walls. Telescopically disposed within the lower end of the pipe 194 is a rod 196, the lower end of which is bent into the form of a hook 203 connected to the top flange of a rearwardly extending angle iron 205 fixed to the cutter housing support bracket 31, and in the left hand end of the box beam 23, respectively. A collar 200 embraces the rod 196 and is fixed thereto, and a compression spring 201 is disposed between the collar and the end of the pipe 194.

The other leg 193 is a rigid strut for holding the conduit against falling over to one side or the other, and consists of a rod 197 fixed at its upper end to the bracket 195 and having an eye 209 (see Figure 1) at the lower end thereof which is secured by a bolt 198 to the end of the beam 23.

The draft frame 22 of the implement comprises a rear section 213 and a front section 214 pivotally connected thereto for lateral swinging movement between the working position shown in solid lines in Figure 1 and the transport position indicated in broken lines. The rear section 213 consists of a pair of diagonally forwardly extending converging members 215 and 216 which are pivoted at 220 for vertical swinging movement to laterally spaced brackets 221 fixed to the bottom of the beam 23. The front ends of the members 215, 216 are joined together in laterally spaced relation by bracing members 222 and 223, and brackets 224 and 225 are fixed to the front ends of members 215 and 216, respectively. The front section 214 comprises a pair of members 226 and 227 which converge forwardly from the ends of members 215, 216 until they meet, and from this point forward, member 227 is parallel to member 226 and is fixed thereto. The rear end of member 227 is pivoted at 230 to the bracket 225 for lateral swinging movement, and the rear end of member 226 is connected to bracket 224 by means of a pin 231 which is inserted through one of two fore and aft spaced holes 232 in the bracket and through an aligned hole in the member 226. When it is desired to change the draft frame from working position to transport position, or vice versa, the pin 231 is removed, the front section 214 is swung to the new position, and the pin inserted into the other hole 232. A yoke 233 is fixed to the front ends of the members 226, 227 and is connected with the drawbar 20 of the tractor by a pin 234.

Power for driving the mechanism of the ensilage harvester is derived from the power take-off shaft 235 of the tractor, and is transmitted back to the said mechanism by means including a connection 236 which fits over and is clamped to the power take-off shaft. The member 236 is connected with a telescoping drive shaft 240 by a short shaft 241 and universal joints 242 and 243. The drive shaft 240 is disposed above the draft frame 22 and is supported at its front end in a bearing 244 which is held between the forked ends of a support 245. The support 245 is mounted on the front section 214 of the draft frame for fore and aft swinging movement about a transverse pivot 246 and for turning movement about a longitudinal axis, so that the bearing 244 readily accommodates relative movement of the front end of the drive shaft 240 with respect to the draft frame on turns or when the draft frame is changed from working position to transport position. The telescoping drive shaft 249 preferably consists of a square tubular member 250 and a square shaft 251 slidably disposed in the rear end thereof. The rear end of the shaft 251 is provided with a slip clutch 252 which is connected by a universal joint 253 to a shaft 254 projecting forwardly from a gear housing 255 mounted on the end of the box beam 23. Two fore and aft spaced shafts 256 and 260 project laterally from the right hand side of the gear box 255 and are operatively connected with the shaft 254 by suitable gearing (not shown). An extension 261 of the shaft 254 projects rearwardly from the gear housing 255 and has a sprocket 258 mounted thereon in line with the cutter head sprocket 141. A chain 259 is trained around sprockets 258 and 141 to transmit the drive to the cutter head.

Cooperatively associated with the cutter bar 40 is a sickle member 262 which is reciprocable for severing the standing crops. The sickle 262 is driven from the shaft 256 through the agency of a wobble drive mechanism 263 of more or less conventional form, the detailed construction of which is to be found in the co-pending application of Paradise and Anderson, Serial No. 421,566, filed December 4, 1941, now Patent No. 2,297,317, issued September 29, 1942. The wobble drive mechanism 263 does not form a part of the present invention and therefore it is not deemed necessary to describe the same in detail herein. Briefly, however, the device 263 comprises a ball bearing member mounted on the shaft 256 with its axis of generation disposed at an acute angle to the axis of the shaft. The outer race of the bearing member is secured within a trunnion ring, and journaled on the pivots of the trunnion ring is a bifurcated yoke member 264 which is fixedly mounted on the rear end of a sickle driving shaft 265.

The forward end of the shaft 265 is journaled in a suitable bearing mounted on the wall 164, and fixed to the front end of the shaft on the forward side of the wall 164 is a downwardly extending arm 266. The lower end of the arm 266 is connected to the extended shank 270 of the sickle by means of a double ball and socket device, indicated generally by the reference numeral 271 (see Figure 5), comprising a pair of clamping members 272 having substantially hemispherical ball sockets 273 and 274 at each end thereof and clamped together by means of a bolt 275. The lower end of the arm 266 is provided with a ball 276 which is received between the ball sockets 273 at one end of the clamping members 272, and another ball 280 is clamped between the ball sockets 274 at the opposite end of the clamping members. The ball 280 is rigidly supported, as by welding, on a vertically extending web 281 which is welded to the sickle shank 270. The outer end of the sickle shank is slidably supported within a bearing 282 which is rigidly supported on the wall 164.

The feed rolls 52 and 53, and the reel 62 are driven from the rear shaft 260 of the gear box 255. A slip clutch device 283 is mounted on the end of the shaft 260 and is connected by a telescoping shaft 284 and universal joints 285 and 286 to a shaft 76 of the rear feed roll 53. The slip clutch device 283 provides the safety release for the feed roll 53, so that the latter can stop without damage when jammed by a large stone. A sprocket wheel 290 is fixedly mounted on the shaft 76 and is operatively connected by a chain 291 with a sprocket wheel 292 mounted on the shaft 76 of the front feed roll 52. A second sprocket wheel 293 is mounted on the shaft 76 outside of sprocket 292, and is connected by a chain 294 with a sprocket 295 mounted on the outside of the reel hub 179. The chain 294 passes downwardly through openings 296 and 162 (Figure 5) in the top flange 44 of the side wall 42, and is trained around an idler sprocket 300 (Figure 2) journaled at the upper end of an arm 301. The lower end of the arm 301 is fastened at 302 on the harvesting unit frame 14.

Figure 7:
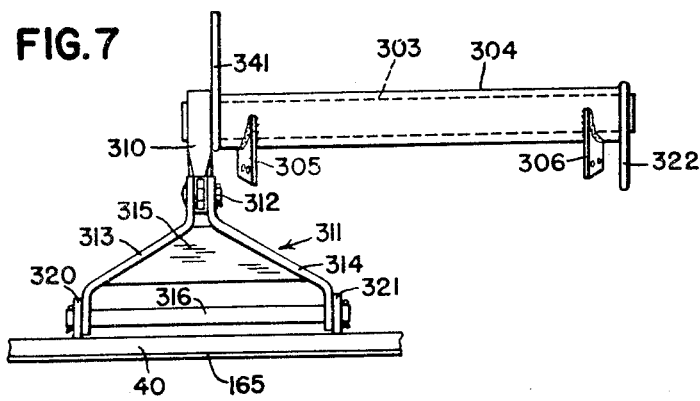
Figure 7 is an enlarged detail view of the lifting linkage, which is operative to raise the front end of the pick-up unit off the ground.

The lower end of the harvesting unit 12 can be raised from the ground for transport by means comprising a transverse torque tube 303 (Figures 1 and 7) which is disposed within and journaled on a pipe 304 mounted on the draft frame members 215 and 216 by brackets 305 and 306. Welded to the end of the tube 303 adjacent the harvesting unit 12 is a forwardly extending arm 310 of box beam section. A forked link 311 is pivoted at 312 to the front end of the arm 310 and depends therefrom, said link comprising a pair of bars 313 and 314 diverging downwardly at a wide angle and joined together by a web 315 which is welded to the bars. The lower ends of the bars 313, 314 are perforated to receive a shaft 316 which also extends through aligned holes in upstanding ears 320 and 321 welded to the shoe 165. Thus, when the tube 303 is rocked, the front end of the harvesting unit is raised by the arm 310 and link 311, rocking the frame 14, harvesting unit 12, and ensilage cutting unit 13 about the axis of the wheels 15, 16. The pivot connection 220 between the box beam 23 and draft frame members 215, 216 accommodates the rocking movement of the frame 14 and associated operating units relative to the draft frame 22. The wide span of the link 311 and the rigid box beam construction of the arm 310 prevent lateral movement of the harvesting unit with respect to the draft frame.

The tube 303 is rocked by means of a downwardly extending arm 322 which is welded to the outer end thereof. A chain 323 is attached to the lower end of the arm 322 and extends forwardly therefrom to connect with an upwardly extending bell crank arm 324 fixed to a hand lever 325. The hand lever 325 is pivoted at 326 on a member 330 fixed to the side of draft member 226, and is provided with a releasable latch 331 which is engageable with a notched sector 332 to hold the lever in adjusted position. The hand lever 325 extends upwardly and forwardly from its pivot 326 to a point within convenient reach of the operator at his station on the tractor, and is provided with a latch-release 333 at its upper end.

The load on the torque tube 303 is partly counterbalanced to facilitate raising and lowering the harvesting unit, by a pair of springs 334 which are attached at 335 (Figure 1) to the beam 23, and are fastened at their front ends by means of threaded nut members 337 to a U-shaped yoke 336. The bight portion of the yoke 336 is connected to an upwardly extending arm 341 which is fixed to the torque tube.

Figure 6:
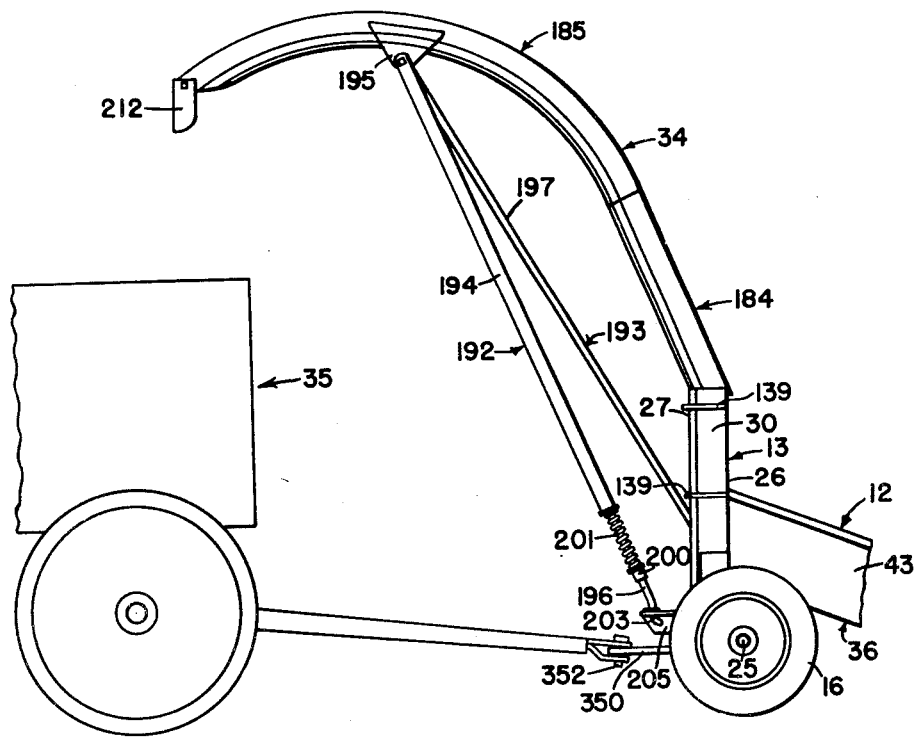
Figure 6 is a side elevational view of the cutter housing and discharge conduit, drawn to a reduced scale.

A draft tongue 350 is fixed to the rear end of the draft frame member 215 and extends rearwardly therefrom to provide a hitch connection for the tongue of the wagon 35 when the latter is towed behind the ensilage harvester, as shown in Figure 6. An aperture 351 (Figure 1) is provided in the rear end of the tongue 350 to receive a hitch pin 352.

It is believed that the operation of my invention and the advantageous features thereof will be apparent to those skilled in the art from the foregoing description, and what I claim as my invention is:

1. In a crop harvesting unit including a platform and cutter bar structure disposed transverse to the direction of forward travel having a transverse cutter bar and a rearwardly extending platform disposed behind said cutter bar and substantially coextensive therewith to receive the crop cut thereby, the improvement residing in crop-gathering means for bending crops transversely inwardly as respects the cutter bar and platform to confine said crops to a width less than the width of the cutter bar, comprising: a reel journaled for rotation about a transverse axis substantially above said platform and cutter bar structure, said reel being appreciably shorter than the latter; side walls converging upwardly from the ends of said platform and cutter bar structure to provide laterally spaced upper edges closely adjacent the ends of said reel, said side walls also diverging forwardly ahead of said platform and cutter bar structure to form dividers, and a plurality of crop engaging fingers mounted on said reel for engaging the crop ahead of said cutter bar and moving it over the latter to said platform.

2. In a crop harvesting unit, a platform and cutter bar structure disposed transverse to the direction of forward travel and having a transverse cutter bar and a rearwardly extending platform disposed behind said cutter bar and substantially coextensive therewith to receive the crop cut thereby, the improvement residing in crop-gathering means for bending crops transversely inwardly as respects the cutter bar and platform to confine said crops to a width less than the width of the cutter bar, comprising: a reel journaled for rotation about a transverse axis substantially above said platform and cutter bar structure, said reel being appreciably shorter than the latter; side walls converging upwardly from the ends of said platform and cutter bar structure to provide laterally spaced upper edges closely adjacent the ends of said reel, said side walls also diverging forwardly ahead of said platform and cutter bar structure to form dividers; and a plurality of crop engaging fingers mounted on said reel for engaging the crop ahead of said cutter bar and moving it over the latter to said platform, said platform being curved to conform with the path of said fingers as the latter sweep the crop rearwardly thereover.

3. In a crop harvesting unit including a cutter bar disposed transverse to the direction of forward travel and a rearwardly extending platform disposed behind said cutter bar and substantially coextensive therewith to receive the crop cut thereby, the improvement comprising: a reel journaled for rotation about a transverse axis substantially above said cutter bar, said reel being appreciably shorter than the latter; side walls converging upwardly from the ends of said cutter bar and sides of said platform to provide laterally spaced upper edges closely adjacent the ends of said reel, said side walls also diverging forwardly ahead of said cutter bar to form dividers; a pair of divider rods extending forwardly from the ends of said dividers, respectively, and curving upwardly and converging inwardly and rearwardly at a level above said cutter bar; and a plurality of crop engageable fingers mounted on said reel for engaging the crop ahead of said cutter bar and moving it over said cutter bar to said platform, said fingers being spaced laterally to pass on both sides of said crop rods in intermeshing relation, to strip any crop material from the latter.

4. In a crop harvester having a cutter bar disposed transverse to the direction of travel of the harvester and including a platform disposed behind the cutter bar and extending rearwardly therefrom and being substantially coextensive therewith in transverse extent, the improvement residing in crop-gathering means for bending crops transversely inwardly as respects the cutter bar and platform to confine said crops to a width less than the width of the cutter bar, comprising: a pair of side walls, one at each side of the paltform and extending from the cutter bar toward the rear of the platform, at least one of said walls being further inclined upwardly and transversely inwardly so that its upper portion overhangs the proximate portions of the cutter bar and platform, said one side wall being extended ahead of the cutter bar and platform to form a divider and further having at its forward portion a divider rod secured thereto and curving upwardly and rearwardly and inclined inwardly at a level above the cutter bar; and a reel extending transversely of and above the platform and cutter bar and journaled for rotation on a transverse axis, said reel in transverse extent being appreciably shorter than the transverse extent of the cutter bar and operating between said walls.

5. In a crop harvester having a cutter bar disposed transverse to the direction of travel of the harvester and including a platform disposed behind the cutter bar and extending rearwardly therefrom and being substantially coextensive therewith in transverse extent, the improvement residing in crop-gathering means for bending crops transversely inwardly as respects the cutter bar and platform to confine said crops to a width less than the width of the cutter bar, comprising: a pair of side walls, one at each side of the platform and extending from the cutter bar toward the rear of the platform, each of said walls being further inclined upwardly and transversely inwardly so that the upper portions thereof converge generally toward the center of the platform and cutter bar and overhang the proximate portions of the cutter bar and platform, said side walls being extended ahead of the cutter bar and platform in diverging relationship so that their forward end portions are spaced farther apart than the transverse extent of the cutter bar to form dividers, each side wall further including at its forward portion a divider rod secured thereto and curving upwardly and rearwardly and inclined inwardly at a level above the cutter bar; and a reel extending transversely of and above the platform and cutter bar and journaled for rotation on a transverse axis, said reel in transverse extent being appreciably shorter than the transverse extent of the cutter bar and operating between said walls.

MILES H. TUFT.

REFERENCES CITED

The following references are of record in the file of this patent:

UNITED STATES PATENTS

| Number | Name | Date |
|---|---|---|
| Re. 21,421 | Troyer | Apr. 9, 1940 |
| 14,148 | Manny | Jan. 22, 1856 |
| 328,266 | White | Oct. 13, 1885 |
| 507,255 | Benroth | Oct. 24, 1893 |

(Other references on following page)

UNITED STATES PATENTS

| Number | Name | Date |
|---|---|---|
| 796,207 | Harbor | Aug. 1, 1905 |
| 930,617 | Riley | Aug. 10, 1909 |
| 981,319 | Seibert | Jan. 10, 1911 |
| 1,589,697 | Howd | June 22, 1926 |
| 1,665,401 | Blecke | Apr. 10, 1928 |
| 1,683,042 | Krogan | Sept. 4, 1928 |
| 1,684,886 | Rabie | Sept. 18, 1928 |
| 1,832,033 | Lassagne | Nov. 17, 1931 |
| 1,934,198 | Mainland | Nov. 7, 1933 |
| 2,062,582 | Kowalsky | Dec. 1, 1936 |
| 2,099,471 | Edgington | Nov. 6, 1937 |
| 2,165,381 | Hume | July 11, 1939 |
| 2,199,444 | Rouglas | May 7, 1940 |
| 2,208,278 | Orr | July 16, 1940 |
| 2,226,563 | Keith | Dec. 31, 1940 |
| 2,253,633 | Lindley | Aug. 26, 1941 |
| 2,298,121 | Grimes | Oct. 6, 1942 |
| 2,342,282 | Hill | Feb. 22, 1944 |